(12) United States Patent
Ono

(10) Patent No.: US 6,247,076 B1
(45) Date of Patent: Jun. 12, 2001

(54) DATA STORING METHOD AND APPARATUS FOR STORING DATA WHILE EFFECTIVELY UTILIZING A SMALL CAPACITY OF A MEMORY

(75) Inventor: Hiroshi Ono, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/203,901

(22) Filed: Dec. 2, 1998

(30) Foreign Application Priority Data

Dec. 17, 1997 (JP) .................................................. 9-364077

(51) Int. Cl.⁷ ............................. G06F 13/14; G06F 13/16
(52) U.S. Cl. .............................. 710/65; 710/52; 710/57; 710/74; 709/206; 711/147; 711/171; 711/172
(58) Field of Search ............................... 709/206; 710/65, 710/74, 57, 52; 711/100, 147, 171, 172

(56) References Cited

U.S. PATENT DOCUMENTS

| | | | |
|---|---|---|---|
| 5,117,395 | * | 5/1992 | Hashimoto ........................... 365/221 |
| 5,463,776 | | 10/1995 | Voigt . |
| 5,933,247 | * | 8/1999 | Shibata ................................ 358/404 |
| 6,108,667 | * | 8/2000 | Clark et al. ........................... 707/200 |

FOREIGN PATENT DOCUMENTS

| | | | |
|---|---|---|---|
| 1-212046 | | 8/1989 | (JP) . |
| 4-353951 | | 12/1992 | (JP) . |
| 5-199261 | | 8/1993 | (JP) . |
| 5-252200 | | 9/1993 | (JP) . |
| 6-97962 | | 4/1994 | (JP) . |
| 6-268678 | | 9/1994 | (JP) . |
| 7-273791 | | 10/1995 | (JP) . |
| 8-116336 | | 5/1996 | (JP) . |
| 8-167275 | | 6/1996 | (JP) . |
| 8-272655 | | 10/1996 | (JP) . |
| 08314924A | * | 11/1996 | (JP) ................................. B41J/3/36 |
| 8-335951 | | 12/1996 | (JP) . |
| 409065041A | * | 3/1997 | (JP) ................................. H04N/1/00 |
| 9-160814 | | 6/1997 | (JP) . |
| 10-098401 | | 4/1998 | (JP) . |

* cited by examiner

Primary Examiner—Thomas Lee
Assistant Examiner—Rehana Perveen
(74) Attorney, Agent, or Firm—Scully, Scott, Murphy & Presser

(57) ABSTRACT

A data storing apparatus includes a storing unit, an empty capacity detecting unit and a data deleting unit. The storing unit stores data. The empty capacity detecting unit detects an empty capacity of the storing unit. The data deleting unit deletes, a delete data portion, a portion of the data stored in the storing unit based on the detected empty capacity.

26 Claims, 13 Drawing Sheets

Fig. 4

| KEYWORD No. | OPERATION LEVEL | KEYWORD CLASSIFICATION | KEYWORD CONTENT |
|---|---|---|---|
| 1 | 1,2,3 | 1 | "To:","Cc:","From:","Bcc:", "Subject:","Date:" |
| 2 | 3 | 3 | "IMPORTANT","SUMMARIZED" |
| 3 | 1,2,3 | 4 | file name="document.doc", "*.txt" file size<=10k file date="19970926-" |
| 4 | 1,2,3 | 7 | ¥do_not_erase |
| 5 | 3 | 5 | 2 |
| 6 | 3 | 2 | 3 |
| 7 | 1,2 | 6 | To:foo1@abc.co.jp, Cc:foo2@bcd.co.jp |
| .. | | | |

Fig. 5

| | DELETION MARKER |
|---|---|
| IN CASE THAT MAIN DOCUMENT IS DELETED | "----Some line(s) is/are deleted----" |
| IN CASE THAT ATTACHED FILE IS DELETED | "----Attached file is deleted: <finename>----" |

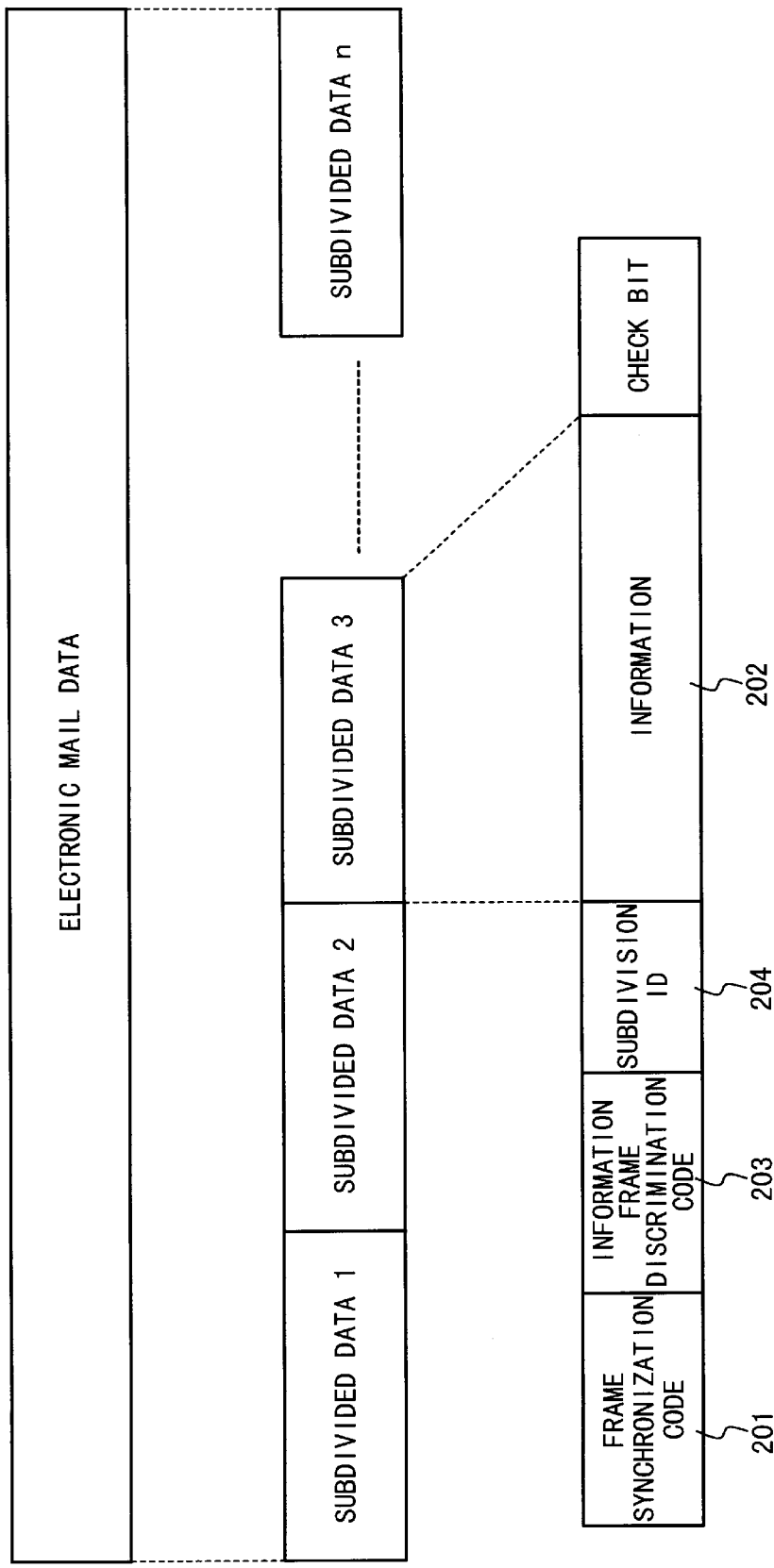

DATA STORING METHOD AND APPARATUS FOR STORING DATA WHILE EFFECTIVELY UTILIZING A SMALL CAPACITY OF A MEMORY

BACKGROUND OF THE INVENTION

1. Field of the Invention

The present invention generally relates to a method and an apparatus for storing data, for example, electronic mail data. More specifically, the present invention is directed to such a storing method and such an apparatus, capable of storing data while effectively utilizing a small storage capacity of a memory.

2. Description of the Related Art

Portable terminals used in portable telephone systems are specifically required to be made compact and in low cost. As a result, generally speaking, a storage capacity of a memory employed in such a portable terminal is greatly smaller than that of a personal computer.

In the case that a portable terminal is used as an electronic mail terminal, the below-mentioned difficulties may occur because of such a small memory capacity. That is, when such a portable terminal is tried to receive electronic mail data transferred from a personal computer, for instance, this portable terminal directly receive such electronic mail data via a network, e.g., the Internet, a memory full condition will immediately occur. Under this memory full state, the user of this electronic mail terminal cannot receive subsequent electronic mails, or is forcibly required to delete the received electronic mails from this memory.

To solve the above-explained memory full problem caused by a small memory capacity, several application software and communication services have been provided. For example, in the electronic mail application software, the indication of the header is selected. In the mail application software, the electronic mails which have received and have passed for longer than a preselected time period are automatically deleted. In the personal computer communication service, the user can freely select whether or not the electronic mail header data is transferred.

In the above-explained electronic mail application software capable of selecting the indication of the header, the unnecessary sort of headers can be selected by the user so as to restrict the header indication. Precisely speaking, the unnecessary data are not displayed on the electronic mail terminal, for example, the route information and the message ID, which are contained in the header and cannot directly give influences to the content of the main document. Also, such data are not required to be displayed due to limitations in the display screen, and/or due to use conditions. In a personal computer, generally speaking, a user can display an electronic mail after the user once decides not to display this electronic mail, while this electronic mail is saved in a memory unit such as a hard disk unit of this personal computer. However, since a portable terminal is not equipped with such a hard disk type memory, this solution is not properly applied to such a portable terminal.

In the mail application software capable of automatically deleting such electronic mails which have been saved for more than a preselected time period, since the saving time period of the electronic mail in the personal computer is restricted, a total number of saved electronic mails can be automatically reduced. In this case, since this application software judges that the older electronic mails are unnecessary mails, this application software cannot correctly judge whether or not the older electronic mails are actually unnecessary mails. Under such a circumstance, this application software cannot be directly applied to such portable terminals.

In the above-explained personal computer communication service, the headers of the electronic mails are not transferred. This software can save the data transfer time. However, it is useless to secure a memory region for storing unnecessary header data. Moreover, if such an unnecessary memory region is secured, then a total memory capacity would be reduced, so that the actually stored data amount, namely number/data amounts of electronic mails, would be decreased. Also, there are some electronic mail data which can be hardly judged as unnecessary mail data. Therefore, this communication service cannot be directly applied to such a portable terminal.

Japanese Laid Open Patent Application(JP-A-Heisei 1-212046) describes the following mail buffer management technique. That is, while the lengths of the messages which can be stored in the storage apparatus every terminal are set, an entry of a new message which exceeds this set value is rejected by the mail buffer management system. When the unused memory capacity of the storage apparatus is smaller than, or equal to a predetermined value, a new message may be stored in the storage apparatus in this mail buffer management system.

However, in this mail buffer management system, the following mail storing operation cannot be done. That is, the new mail message is partially selected in accordance with the present unused memory capacity of the storage apparatus, and then this selected mail message portion is stored. Also, since the older mail messages which have been saved for more than a preselected time period are recognized as the unnecessary mail messages, this mail buffer management system cannot correctly judge the actually required mail message.

Also, Japanese Laid Open Patent Application(JP-A-Heisei 4-353951) discloses the electronic mail deleting system used in the electronic mail system.

This conventional electronic mail deleting system is arranged by the delete subject mail condition input means 4 for inputting the deletion condition of the mail to be deleted, the delete subject mail condition judging means 5 for producing the retrieve condition from the condition entered from the delete subject mail condition input means 4, the delete subject mail retrieving means 6 for retrieving the delete subject mail 3 from the mail box file 2 based upon the retrieve condition, the delete subject mail confirming means 7 for confirming the deletion of the mail 3 to be deleted via the prepared input/output means 9, and also the delete subject mail deleting means 8 for deleting the mail 3 which is confirmed to be deleted by the delete subject mail confirming means 7 from the mail box file 2.

This conventional mail deleting system may solve such a problem that the saved mails are deleted one by one, resulting in a lower efficiency. That is, after the plural mails have been saved in the storage apparatus and the mail reception time has passed preselected time, or predetermined expiration date, these plural mails are deleted one by one, which causes the low efficiency in the mail deletion.

However, this mail deleting system cannot achieve the above-explained purpose that when the mail data is stored into the memory, the memory capacity is effectively used.

Also, Japanese Laid Open Patent Application(JP-A-Heisei 5-199261) describes the following electronic mail system.

This conventional electronic mail system is arranged by the mail box maintenance condition instructing unit 1 for setting the deletion condition of the electronic mail, the mail box maintenance unit 20 for deleting the electronic mail from the mail box file 6 in accordance with the deletion condition, the automatic operation condition instructing unit 3 for setting the time condition used to delete the electronic mail, and the automatic operating unit 4 for automatically initiating the mail box maintenance unit 2 in accordance with the time condition.

This conventional electronic mail system can automatically delete the unnecessary electronic mail from the mail box file 6 by combining the mail box maintenance unit 2 and the automatic operating unit 4. As a result, even in such an electronic mail system that there is no job for continuously monitoring the mail box, the unnecessary electronic mails can be regularly and effectively deleted irrespective of the user's condition and the system manager's will, and further the 24-hour operable system.

However, this electronic mail system cannot achieve the above-explained purpose that when the mail data is stored into the memory, the memory capacity is effectively used.

Also, Japanese Laid Open Patent Application (JP-A-Heisei 5-252200) discloses the below-mentioned electronic mail managing apparatus.

In this electronic mail managing system, the management information table 2 stores thereinto at least one of the management information, e.g., constant time, a total number of mails stored in the mail box 11, a memory capacity, and a memory remaining capacity of the mail box 11. The judging means 1 judges as to whether or not the mail stored in the mail box 11 is made coincident with at least one of the above-explained management information stored in the management information table 2. The saved mail list file 7b saves at least one of first several lines contained in the mail sender, the mail sending data, and the main mail document. The save processing means 6 saves the respective mails contained in the mail box 11 into the mail save file 7a when the judging means 1 judges that the mail is coincident with the management information. And, this save processing means 6 saves the mail sender into the saved mail list file 7b.

In accordance with this electronic mail managing apparatus, before a large number of electronic mails are stored in the mail box, the stored mails can be properly deleted/saved for the sake of easy mail reference occurred in near future.

However, this mail deleting system cannot achieve the above-explained purpose that when the mail data is stored into the memory, the memory capacity is effectively used.

Furthermore, Japanese Laid Open Patent Application(JP-A-Heisei 6-97962) discloses the following electronic mail system.

In this conventional electronic mail system, when the empty capacity of the mail box is smaller than, or equal to the reference capacity, such an electronic mail having a low importance degree is prohibited to be saved into the mail box, depending upon the importance degree data contained in the additional information of the electronic mail. As a result, when the electronic mail having the high importance degree is arrived, this electronic mail can be stored into the mail box with a top priority. Also, the electronic mails having the high importance degrees can be practically stored into the mail box with priority degrees by employing the following method. That is, the mail box is previously subdivided into a plurality of areas. These areas are ordered based the stored orders. All of the electronic mails are stored into the areas in the vicinity of at least heads of the storage orders irrespective of the importance degrees thereof. On the other hand, such electronic mails having lower importance degrees are prohibited to be stored into at least the area having the last storage order.

However, this electronic mail system cannot partially select the electronic mail in accordance with the empty capacity, and cannot store only the selected mail portion. Also, this electronic mail system judges that the mail messages which have saved for more than a preselected time period and also the old mail messages are equal to the unnecessary mail message, so that this conventional mail system cannot correctly judge the actually required mail messages.

The present invention has been made to solve the above-described drawbacks, and therefore, has an object to provide a data storing apparatus and a data storing method, capable of using a memory having a small memory capacity.

SUMMARY OF THE INVENTION

The present invention is made to solve the above-described problems in the related arts as mentioned above.

The present invention is accomplished in order to solve the above mentioned problem. Therefore, an object of the present invention is to provide a data storing apparatus capable of storing data while effectively utilizing a small storage capacity of a memory.

In order to achieve an aspect of the present invention, a data storing apparatus includes a storing unit for storing data, an empty capacity detecting unit for detecting an empty capacity of the storing unit and a data deleting unit for deleting, a delete data portion, a portion of the data stored in the storing unit based on the detected empty capacity.

In this case, the data deleting unit changes at least one of a position of the delete data portion and an amount of the delete data portion based on the detected empty capacity when the delete data portion is deleted.

In this case, a data storing apparatus, further includes a deletion mark data attaching unit for attaching to the data, mark data corresponding to a deletion mark indicating that the delete data portion is deleted such that the deletion mark is displayed when the data is displayed.

Also, in this case, the storing unit stores a plurality of the data, and the data storing apparatus further includes a data selecting unit for selecting at least one from the plurality of data stored in the storing unit based on the detected empty capacity, and the data deleting unit deletes a portion of the selected data as a selected delete data portion.

Further, in this case, the data deleting unit changes at least one of a position of the selected delete data portion and an amount of the selected delete data portion based on the detected empty capacity when the selected delete data portion is deleted.

In order to achieve another aspect of the present invention, a data storing apparatus further includes a designating unit for designating at least a portion of the data as a deletion region, and the data deleting unit deletes the deletion region.

In this case, the designating unit changes at least one of a position of the deletion region and a range of the deletion region based on the detected empty capacity.

Also, in this case, a data storing apparatus further includes a designating unit for designating at least a portion of the data as a delete prohibition data portion, and the data deleting unit deletes at least a portion of the data other than the designated delete prohibition data portion.

Further, in this case, the designating unit changes at least one of a position of the delete prohibition data portion and a range of the delete prohibition data portion based on the detected empty capacity.

In this case, a data storing apparatus further includes a table in which a designation condition used to designate the delete prohibition data portion is stored, and the designating unit refers to the table to judge whether or not the data can satisfy the designation condition stored in the table, and designates the delete prohibition data portion based on the designation condition when the designating unit judges that the data can satisfy the designation condition.

In order to achieve still another aspect of the present invention, the designation condition stored in the table is rewritable.

In this case, a plurality of the designation conditions are stored in the table and when the designating unit judges that the data can satisfy a first designation condition among the plurality of designation conditions, the designating unit designates the delete prohibition data portion without executing a judgement of whether or not the data can satisfy a second one among the plurality of designation conditions.

In order to achieve yet still another aspect of the present invention, the stored designation condition corresponds to a specific data structural portion for constituting a portion of the data and the designating unit refers to the table to check whether or not the data contains the specific data structural portion stored in the table, and when the data contains the specific data structural portion, the designating unit designates a predetermined data portion corresponding to the specific data structural portion contained in the data as the delete prohibition data portion.

In order to achieve further still another aspect of the present invention, the predetermined data portion constitutes a unit selected from one of a line of the data, a paragraph of the data, and the data itself.

In order to achieve another aspect of the present invention, the stored designation condition corresponds to a combination of a specific data structural portion for constituting a portion of the data and the detected empty capacity, and the designating unit refer to the table to check whether or not the data contains the specific data structural portion combined with the detected empty capacity, and when the data contains the specific data structural portion combined with the detected empty capacity, the designating unit designates as the delete prohibition data portion, a predetermined data portion corresponding to the specific data structural portion combined with the empty capacity and contained in the data.

In this case, the predetermined data portion constitutes a unit selected from one of a line of the data, a paragraph of the data, and the data itself.

Also, in this case, the storing unit stores a plurality of the data, and the data storing apparatus further includes a designating unit which can designate at least a portion of the data, and a data classifying unit for classifying the plurality of data into subject data which is designated as a subject by the designating unit, and non-subject data which is not designated as a subject by the designating unit, and the data deleting unit deletes at least a portion of the data other than the portion designated by the designating unit of the subject data, and the data classifying unit changes a ratio of the subject data to the non-subject data in the plurality of data based on the detected empty capacity.

Further, in this case, the data is electronic mail data and the specific data structural portion corresponds to any one of header data, cited data, attached file data, mail address data, and holder data, in which the head data is contained in the electronic mail data, the cited data is cited from another electronic mail data contained in the electronic mail data, the attached file data is contained in the electronic mail data, the mail address data is contained in the electronic mail data, and the holder data is contained in the electronic mail data and indicates a holder for storing the electronic mail data.

In this case, the data is electronic mail data and the specific data structural portion is any one of data indicative of a specific phrase contained in main sentence data indicative of a content of the electronic mail data, and data representative of a space number existed in an each line head of the main sentence data.

In order to achieve still another aspect of the present invention, a data storing method includes the steps of storing data in a storing unit, detecting an empty capacity of the storing unit and deleting, a delete data portion, a portion of the data based on the detected empty capacity.

In order to achieve yet still another aspect of the present invention, the step of deleting a delete data portion includes changing at least one of a position of the delete data portion and an amount of the delete data portion based on the detected empty capacity when the delete data portion is deleted.

In order to achieve further still another aspect of the present invention, a data storing method, further includes the step of attaching to the data, mark data corresponding to a deletion mark indicating that the delete data portion is deleted such that the deletion mark is displayed when the data is displayed.

In this case, the step of storing data includes storing a plurality of the data, and the data storing method further includes the step of selecting at least one from the plurality of data based on the detected empty capacity, and the step of deleting a delete data portion includes deleting a portion of the selected data as a selected delete data portion.

In this case, the step of deleting a delete data portion includes changing at least one of a position of the selected delete data portion and an amount of the selected delete data portion based on the detected empty capacity when the selected delete data portion is deleted.

In this case, a data storing method, further includes the step of designating at least a portion of the data as a deletion region, and the step of deleting a delete data portion includes deleting the deletion region.

In this case, the step of designating at least a portion of the data includes changing at least one of a position of the deletion region and a range of the deletion region based on the detected empty capacity.

Also, in this case, a data storing method, further includes the step of designating at least a portion of the data as a delete prohibition data portion, and the step of deleting a delete data portion includes deleting at least a portion of the data other than the designated delete prohibition data portion.

Further in this case, the step of designating at least a portion of the data includes changing at least one of a position of the delete prohibition data portion and a range of the delete prohibition data portion based on the detected empty capacity.

In this case, a data storing method further includes, the step of providing a table in which a designation condition used to designate the delete prohibition data portion is stored, and the step of designating at least a portion of the data includes referring to the table to judge whether or not the data can satisfy the designation condition stored in the table, and designating the delete prohibition data portion based on the designation condition when the data is judged to satisfy the designation condition.

Also, in this case, the step of providing a table includes providing the table such that the designation condition stored in the table is rewritable.

Further in this case, the step of providing a table includes providing the table such that a plurality of the designation conditions are stored in the table, and the step of designating at least a portion of the data includes, when the data is judged to satisfy a first designation condition among the plurality of designation conditions, designating the delete prohibition data portion without executing a judgement of whether or not the data can satisfy a second one among the plurality of designation conditions.

Also, in this case, the step of providing a table includes providing the table such that the stored designation condition corresponds to a specific data structural portion for constituting a portion of the data, and the step of designating at least a portion of the data includes referring to the table to check whether or not the data contains the specific data structural portion stored in the table, and when the data contains the specific data structural portion, designating a predetermined data portion corresponding to the specific data structural portion contained in the data as the delete prohibition data portion.

In this case, the step of designating at least a portion of the data includes designating the predetermined data portion which constitutes a unit selected from one of a line of the data, a paragraph of the data, and the data itself.

Also, in this case, the step of providing a table includes providing the table such that the stored designation condition corresponds to a combination of a specific data structural portion for constituting a portion of the data and the detected empty capacity, and the step of designating at least a portion of the data includes referring to the table to check whether or not the data contains the specific data structural portion combined with the detected empty capacity, and, when the data contains the specific data structural portion combined with the detected empty capacity, designating as the delete prohibition data portion, a predetermined data portion corresponding to the specific data structural portion combined with the empty capacity and contained in the data.

Further in this case, the step of designating at least a portion of the data includes designating the predetermined data portion which constitutes a unit selected from one of a line of the data, a paragraph of the data, and the data itself.

In this case, the step of storing data includes storing a plurality of the data, and the data storing method further includes, the steps of providing a designating unit which can designate at least a portion of the data, and classifying the plurality of data into subject data which is designated as a subject by the designating unit, and non-subject data which is not designated as a subject by the designating unit, and the step of deleting a delete data portion includes deleting at least a portion of the data other than the portion designated by the designating unit of the subject data, and the step of classifying includes changing a ratio of the subject data to the non-subject data in the plurality of data based on the detected empty capacity.

Also, in this case, the data is electronic mail data and the specific data structural portion corresponds to any one of header data, cited data, attached file data, mail address data, and holder data, in which the head data is contained in the electronic mail data, the cited data is cited from another electronic mail data contained in the electronic mail data, the attached file data is contained in the electronic mail data, the mail address data is contained in the electronic mail data, and the holder data is contained in the electronic mail data and indicates a holder for storing the electronic mail data.

Further in this case, the data is electronic mail data and the specific data structural portion is any one of data indicative of a specific phrase contained in main sentence data indicative of a content of the electronic mail data, and data representative of a space number existed in an each line head of the main sentence data.

Also, in this case, a data storing method, includes, the steps of storing first data in a storing unit, detecting an empty capacity of the storing unit when the first data is stored in the storing unit, receiving second data, deleting a portion of the second data based on the detected empty capacity, and storing the second data, the portion of which has been deleted.

Further in this case, a data storing method, includes, the steps of storing first data in a storing unit, detecting an empty capacity of the storing unit when the first data is stored in the storing unit, receiving second data, comparing a value of the detected empty capacity with a predetermined value, deleting only a portion of the second data when the value of the detected empty capacity exceeds the predetermined value, and deleting both a portion of the first data and the portion of the second data when the value of the detected empty capacity does not exceed the predetermined value based on the comparison result, and storing the second data, the portion of which has been deleted.

In this case, a computer readable recording medium for recording a program for a process includes, the steps of storing data in a storing unit, detecting an empty capacity of the storing unit, and deleting, a delete data portion, a portion of the data based on the detected empty capacity.

Also, in this case, a computer readable recording medium, further includes, the step of attaching to the data, mark data corresponding to a deletion mark indicating that the delete data portion is deleted such that the deletion mark is displayed when the data is displayed.

Further, in this case, a data storing apparatus includes a storing unit for storing data, a designating unit for designating at least a portion of the data as a delete prohibition data portion, and a data deleting unit for deleting at least a portion of the data other than the designated delete prohibition data portion.

BRIEF DESCRIPTION OF THE DRAWINGS

A more complete understanding of the present invention is made of reading a detailed description in conjunction with the accompanying drawings, in which:

FIG. 5 is an explanatory diagram for explaining a deletion marker used in the data storing apparatus of this embodiment.

DESCRIPTION OF THE PREFERRED EMBODIMENTS

Referring now to drawings, various preferred embodiments of the present invention will be described in detail.

ARRANGEMENT OF ELECTRONIC MAIL TERMINAL IN WIRELESS TERMINAL

Figure 1:
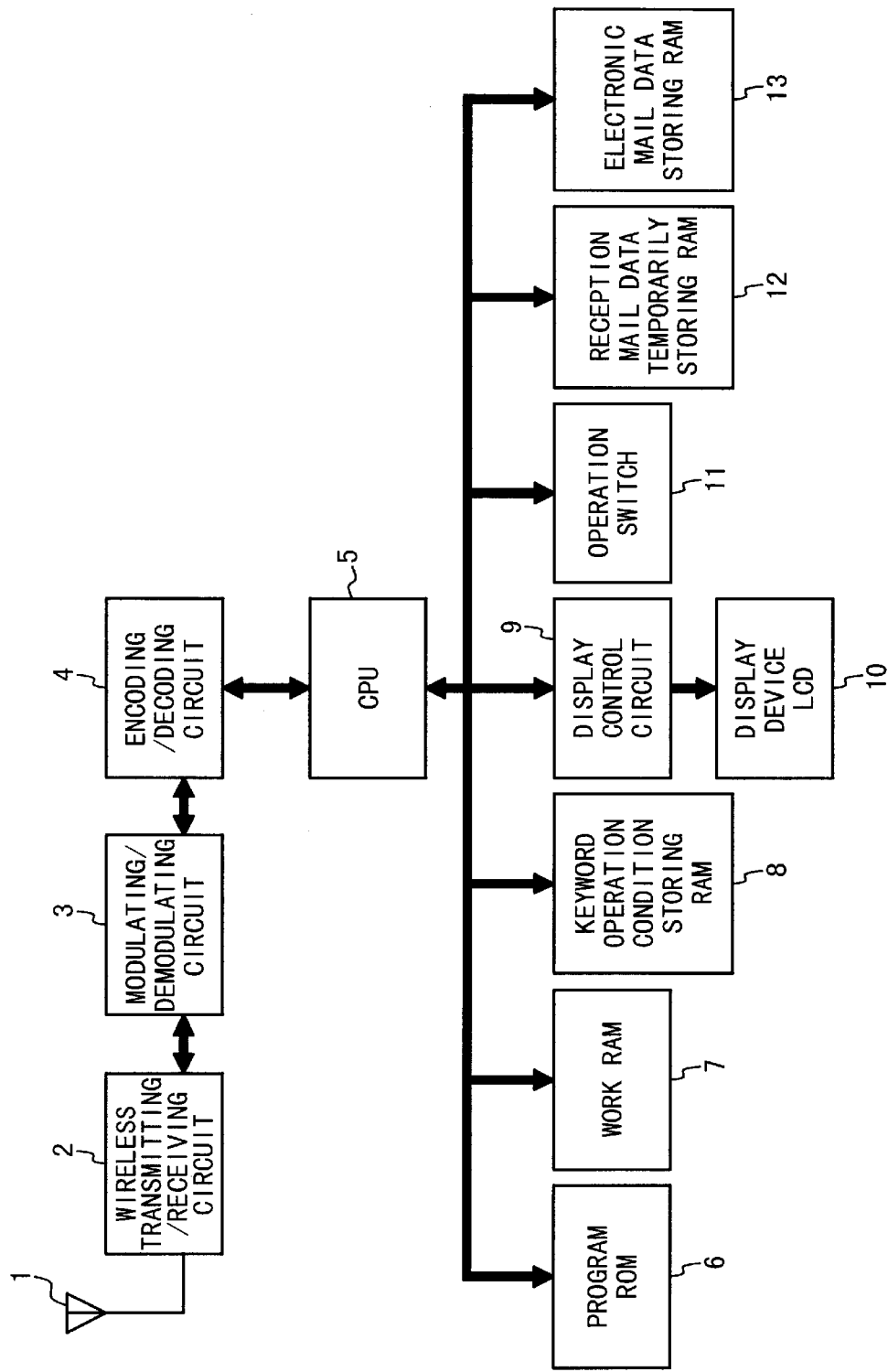
FIG. 1 is a block diagram for schematically showing a data storing apparatus (electronic mail terminal) according to an embodiment of the present invention.

FIG. 1 schematically shows an arrangement of an electronic mail terminal (corresponding to a data storing apparatus of the present invention) used in a wireless (radio) terminal. This electronic mail terminal is arranged by an antenna 1, a wireless (radio) transmitting/receiving circuit 2, a modulating/demodulating (modem) circuit 3, an encoding/decoding circuit 4, and a CPU (central processing unit) 5. The electronic mail terminal is further arranged by a program ROM (read-only memory) 6, a work RAM (random access memory) 7, another RAM 8 for temporarily storing a keyword operation condition, a display control circuit 9, an LCD (liquid crystal device) 10, an operation switch 11, another RAM 12 for temporarily storing reception mail data, and also another RAM 13 for storing electronic mail data.

The antenna 1 is used to communicate transmission/reception data via a wireless transmission path.

The wireless transmitting/receiving circuit 2 is connected to the antenna 1 so as to communicate transmission/reception data via this antenna 1.

The modulating demodulating circuit 3 is connected to the wireless transmitting/receiving circuit 2 in order to demodulate data received from the wireless transmitting/receiving circuit 2, and also to transmit data to the wireless transmitting/receiving circuit 2.

The encoding/decoding circuit 4 is connected to the above modulating/demodulating circuit 3 so as to decode data received from the modulating/demodulating circuit 3, and also to encode data transmitted to the modulating/demodulating circuit 3. Also, the encoding/decoding circuit 4 performs an error detection and an error correction in a wireless section.

The CPU 15 is connected to the encoding/decoding circuit 4, and further connected to the program ROM 6, the work RAM 7, the keyword operation condition storing RAM 8, the display control circuit 9, the operation switch 11, the reception mail data temporarily storing RAM 12, and the electronic mail data storing RAM 13. Thus, this CPU 5 controls the overall electronic mail terminal. In other words, this electronic mail terminal may perform electronic mail data forming/editing/saving/transmitting/receiving/dis play operations under control of this CPU 5, and also may execute wireless data communications via the wireless transmission path under control of this CPU 5. The CPU 5 owns a means for counting an empty capacity of the electronic mail data storing RAM 13. Furthermore, the CPU 5 may partially editing/deleting electronic mail data stored in the electronic mail data storing RAM 13 in accordance with the operation condition of the keyword operation condition storing RAM 8.

The program ROM 6 stores thereinto an operating program.

The work RAM 7 may provide an operation memory area of the CPU 5.

The keyword operation condition storing RAM 8 stores thereinto the operation condition used to partially edit/delete the stored electronic mail data in accordance with the empty capacity of the electronic mail data storing RAM 13. The keyword operation condition storing RAM 8 may store thereinto more than one sort of the keyword, more than one content of the keyword, and more than one level of the detected levels.

The display device control circuit 9 controls the LCD 10.

The LCD 10 functions as a display device capable of displaying data and the like.

The operation switch 11 is employed so as to perform various operations.

The reception mail data temporarily storing RAM 12 temporarily stores received electronic mail.

The electronic mail data storing RAM 13 stores electronic mail data.

OVERALL OPERATION OF ELECTRONIC MAIL TERMINAL

Figure 2:
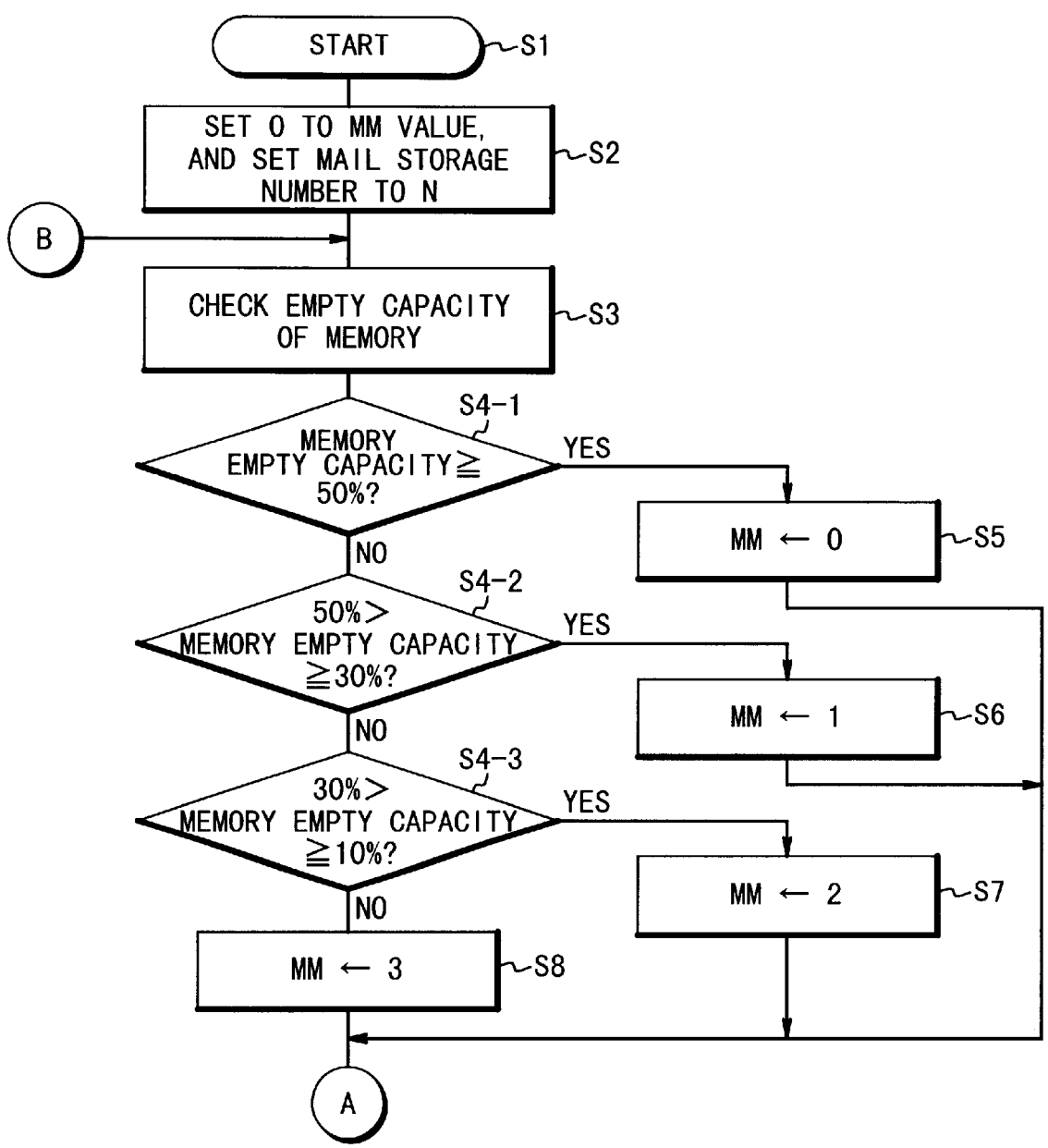
FIG. 2 is a flow chart for describing a portion of a basic operation of the data storing apparatus according to the embodiment of the present invention.
Figure 3:
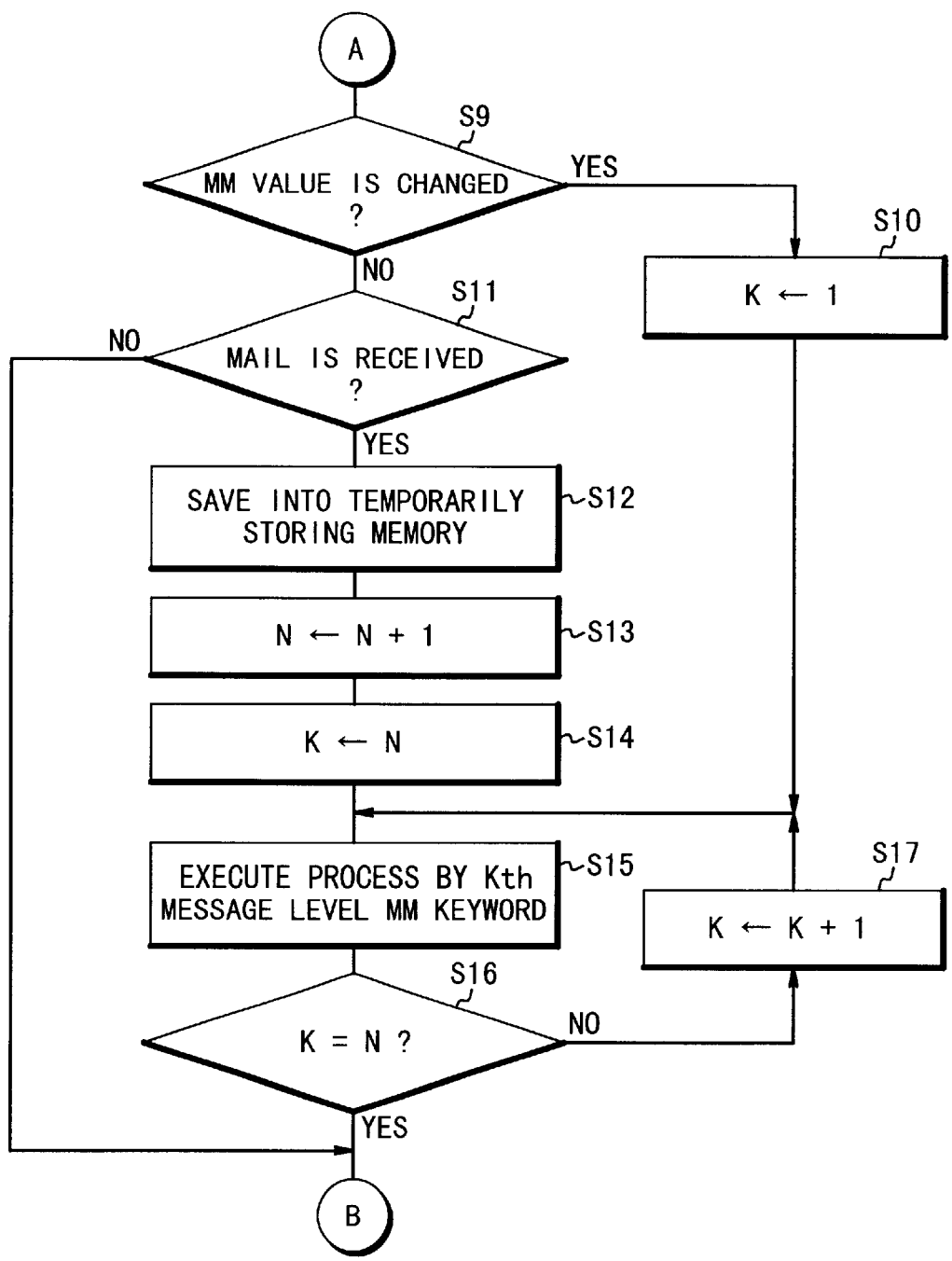
FIG. 3 is a flow chart for describing a portion of a basic operation of the data storing apparatus according to the embodiment of the present invention, FIG. 4 schematically shows a content of a table into which keyword operation condition data is stored in the data storing apparatus of FIG. 1.

Referring now to FIG. 1 to FIG. 3, overall operation of the electronic mail terminal will be described in detail.

As an initial setting operation, an MM value indicative of an empty capacity state of the electronic mail data storing RAM 13 is set to 0 (namely, memory empty capacity is higher than, or equal to 50%), and then a storage number of the electronic mail data is substituted for N (step S2 of FIG. 2).

At steps S3, S4-1, S4-2 and S4-3, the empty capacity of the electronic mail data storing RAM 13 is checked. Concretely speaking, in the case that the empty capacity of the RAM 13 is higher than, or equal to 50%, the memory empty capacity value MM=0 is substituted for N (steps S4-1 and S5). In such a case that the empty capacity of the RAM 13 is higher than, or equal to 30% and less than 50%, the memory empty capacity value MM=1 is substituted for N (steps S4-2 and S6). When the empty capacity of the RAM 13 is higher than, or equal to 10% and less than 30%, the empty capacity state value MM=2 is substituted for N (steps S4-3 and S7). In such a case that the empty capacity of the RAM 13 is less than 10%, the memory empty capacity value MM=3 is substituted for N (step S8).

Subsequently, a check is done as to whether or not the memory empty capacity value MM is changed at a step S9 of FIG. 3. Then, when it is so judged that the memory empty capacity value MM is changed, an index number "K" is set to "1" at a step S10. This index number K indicates a retrieve position of an electronic mail. Conversely, when it is so judged that the index number "K" is not changed, another check is made as to whether or not the electronic mail is received at a step S11.

When such a judgement is made that no electronic mail is received at this step S11, subsequent process flow operations are not executed, but the process operation is returned to the previous step S3. Conversely, when it is so judged at this step S11 that the electronic mail is received, the mail data of this electronic mail is temporarily stored into the electronic mail data storing RAM 12 (step S12). Then, "1" is added to the storage number N of the electronic mail data (step S13), and the index number K of the retrieving electronic mail is set to "N" (step S14). In this embodiment, the index number K=1 indicates the oldest electronic mail (see step S10) whereas the index number K=N indicates the latest electronic mail.

Subsequent to either the above-described step S14 or the step S10, with respect to the index number K of the electronic mail, the electronic mail data stored in the electronic mail temporarily storing RAM 12 and the electronic mail storing RAM 13 are controlled in accordance with the condition of the level MM value (either "1" or "3") stored in the keyword operation condition storing RAM 8 at a step S15.

It should be noted that controls of this electronic mail data will be described with reference to FIG. 4 to FIG. 13.

Next, a judgement is made as to whether or not the index number K is equal to "N" at a step S16 of FIG. 3. When it is so judged that the index number K is not equal to "N", "1" is added to this index number K (step S17), so that (K+1)-th electronic mail data corresponding to this index number K is controlled at a step S15.

Similar to the above operation, the control of the electronic mail data is repeatedly performed until K=N at steps S16 and S17. As a result, at a step S9, when it is so judged that the empty capacity value MM is changed, all of the electronic mail data are controlled at steps S10, S16, and S17.

On the other hand, conversely, when it is so judged at the step S9 that the memory empty capacity value MM is not changed, only such electronic mail data received after this judgment is controlled at step S13, S14 and S16.

TOTAL NUMBER OF ELECTRONIC MAIL "N=8"

A more concrete description will now be made of entering concrete values. For instance, the following electronic mail terminal operation is carried out, assuming now that a total storage number "N" of electronic mails presently stored in the electronic mail data storing RAM 13 is equal to "8".

First, as an initial setting condition, "0" is set to the memory empty capacity value MM at the step S2 of FIG. 2, and "8" is set to the mail data storage number N. The memory empty capacity is checked at the steps S3, S4-1, S4-2, S4-3. In this embodiment, it is so assumed that since 8 pieces of the electronic mails have been stored, the empty capacity of the electronic mail data storing RAM 13 is higher than, or equal to 30% and less than 50%. In this case, "1" is set to the memory empty capacity value MM at the steps S4-2 and S6. As a result, at the step S9 of FIG. 3, it is so judged that this MM value is changed from the initial set value "0" defined at the step S2. Thus, the process operation is advanced to the step S10.

Since the initial value of the MM value has been set to "0" at the step S2, if it is so judged at the step S9 that the MM value is changed, then this condition implies that the memory empty capacity is largely decreased. In connection with the large decrease of the memory empty capacity, "1" is set to the index number K at the step S10. At the step S15, as to the first electronic mail data (namely, the firstly stored electronic mail data, i.e., the oldest electronic mail data), the data amount is controlled to be decreased.

A check is made at the step S16 as to whether or not the mail data storage number N (=8) is equal to "1". Since the mail data storage number N is not equal to "1", the process operation is advanced to the step S17. At this step S17, "1" is added to the index number "K", so that the resultant index number "K" becomes "2". Then, at the step S15, as to the second electronic mail data, the data amount is controlled to be decreased. At the further step S16, another check is made as to whether or not the index number N (=8) is equal to "2". Since this index number N is not equal to "2", the process operation is advanced to the step S17. At this step S17, "1" is added to the index number K becomes "3". Subsequently, a similar process operation is repeatedly performed to control the data amount so as to be reduced as to all of the electronic mail data previously stored in the electronic mail data storing RAM 13, namely until the index number K becomes equal to the mail data storage number N=8.

Another case will now be explained. Similar to the above-described concrete case, it is so assumed that a total number N of electronic mails previously stored in the electronic mail data storing RAM 13 is selected to be "8". In this case, even when 8 pieces of the electronic mails have been stored in a similar manner to the above-described concrete example, the following assumption is made which is different from the above-explained concrete example. That is, the memory empty capacity of the electronic mail data storing RAM 13 is larger than or equal to 50%. It should be understood that the process operations defined from the step S1 to the step S9 are identical to those of the above-described case. At the step S9, the memory empty capacity value MM becomes equal to "0". Since there is no change in the MM value, the process operation is advanced to the step S11. Then, when a new electronic mail (namely, 9th electronic mail) is received, this newly received electronic mail is stored into the reception mail data temporarily storing RAM 12 at a step S12 of FIG. 3.

Then, "1" is added to the mail data storage number N at a step S13, so that the resultant mail data storage number N becomes equal to 9. This number 9 indicates a total number of the electronic mails. At a further step S14, "9" is set to the index number K. At the next step S15, the 9th electronic mail data (namely, the latest electronic mail data) is controlled so as to decrease the data amount. At a step S16, a judgment is made as to whether or not the present index number K (×9) is equal to the mail data storage number N (=9). Since this index number K is equal to the mail data storage number N, the process operation is returned to the previous step S3.

In this second concrete case, the memory empty capacity still has a memory space, which is different from the first concrete case. Therefore, only the latest (9th) electronic mail data is controlled so as to reduce the data amount, but all of these electronic mail data (namely, 1st to 9th electronic mail data) are not controlled.

DATA CONTENTS OF KEYWORD OPERATION CONDITION STORING RAM

FIG. 4 indicates an example of data contents stored in the keyword operation condition storing RAM 8.

Since more than 1 operation condition can be stored into the keyword operation condition storing RAM 8, 7 operation conditions are stored in the example of FIG. 4. In FIG. 4, index "keyword NO." indicates a serial number, and index "operation level" shows an empty storage level of the electronic mail data storing RAM 13 when this operation level condition is set is designated. Concretely speaking, the memory empty storage level values MM ("1" to "3") which are judged at the step S3 and the step S4 are described.

For example, "3" is described in the "operation level" of the "keyword NO. 2". This index represents that only when the memory empty capacity level value MM is equal to "3", the above-explained operation condition is set in accordance with the "keyword content" of the "keyword NO.2", and the electronic mail data is controlled under this operation condition.

Also, "1, 2, 3" are described in the "operation levels" of the "keyword NO.3". This index indicates that when the memory empty capacity level value MM is equal to "1, 2, 3", namely the above-explained operation condition is set in accordance with the "keyword content" of the "keyword NO.3" as to all of the cases, the electronic mail data is controlled under this operation condition.

As previously explained, the memory empty capacity values MM judged at the step S3 and the step S4 indicate the following conditions:

MM1—The empty capacity of the electronic mail data storing RAM 13 becomes higher than, or equal to 30% and less than 50%.

MM=2—The empty capacity becomes higher than, or equal to 10% and less than 30%.

MM=3—The empty capacity becomes less than 10%.

Also, in FIG. 4, index "keyword classification" and index "keyword content" are defined in the following 7 items:

The index "keyword classification" is to designate a sort of a keyword.

The number "1" of the index "keyword classification" indicates a header code of an electronic mail. For instance, the header codes are such phrases as "To" and "Cc".

The number "2" of the index "keyword classification" indicates a cited line. In this case, a cited line implies that when such a line for indicating "a sentence or a line where a character of ">" and "|" is located at a head is cited, all lines subsequent to this relevant line are cited.

The number "3" of the index "keyword classification" represents phrases existed in a main document such as "important" and "summarized".

The number "4" of the index "keyword classification" denotes an attached file.

The number "5" of the index "keyword classification" shows a rank designation by a head space number of each line in a main document.

The number "6" of the index "keyword classification" represents a mail address of a sender and a mail address of a receiver.

The number "7" of the index "keyword classification" indicates a name of a holder where mail data is saved.

In such a case that the index "keyword classification" corresponds to "header code of electronic mail" as described as the above-explained number of "1", data corresponding to headers of electronic mails described as the following index "keyword content" is designated as delete prohibit subject data. The contents of the index "keyword content" are given as header IDs, for instance, "To:", "Cc:", "From:", "Bcc:", "Subject:", "Date:". In this embodiment, more than one header ID may be designated among the above-explained plural header IDs.

The "cited line" of the index "keyword classification" described as the number of "2" of the index "keyword classification" will now be explained.

While an electronic mail is returned and/or transferred, a sentence described in another electronic mail is easily cited in the first-mentioned electronic mail. As a result, a large number of unnecessary sentences are provided on the reception side, so that a memory empty capacity is reduced by a large number of cited sentences. The "cited line" of the index "keyword classification" is introduced to consider this capacity reducing aspect. That is, in the "cited line" of the index "keyword classification", such a designation is made that which line of cited lines is prohibited to be deleted. In this case, numeral number is described as the index "keyword content". For example, numeral number "0" indicates that all of the cited lines are deleted. Numeral number "1" indicates that a first line of the cited lines is prohibited to be deleted, and the subsequent continuous cited lines (namely, cited lines subsequent to second line) are deleted. Numeral number "2" represents that the cited lines up to the second cited line are prohibited to be deleted, and the cited lines subsequent to this second line are deleted. Similar line delete indications are applied to numeral number "3" and more.

In the case that the index "keyword classification" is equal to "phrase" as described in the above-described numeral number "3", a phrase contained in a main document is designated. As the index "keyword content", a concrete character is designated. A plurality of "phrases" may be designated.

In such a case that the index "keyword classification" is equal to "attached file" as described in the above-described numeral number "4", an attached file which is prohibited to be deleted is designated. As the index "keyword content", a file name, a file size, and a file date are designated. As this file name, the universal symbol may be used such as [filename="document.doc", "* . txt"]. As the file size, [filesize<=10K] is written, and a file having a capacity lower than 10 Kbytes is prohibited to be deleted. As the file date, [filedate="19970926–"] is written, and electronic mails received within a range designated by this file date (namely, after Sep. 26, 1997) are prohibited to be deleted.

In such a case that the index "keyword classification" is equal to "rank designation" as described as "5", a rank is designated based upon a total number of head spaces contained in the respective lines of the main document, and the deletion in accordance with this designated rank is prohibited. As the index "keyword content", the number of head spaces contained in the main document is described which is prohibited to be deleted. Numeral number "0" implies that a deletion of a line where no space is made at a line head is prohibited. Numeral number "1" implies that a deletion of such a line that a space smaller than, or equal to 1 is made at a line head is prohibited. Numeral number "n" implies that a deletion of such a line that a space smaller than, or equal to "n" is made at a line head is prohibited.

In the case that the index "keyword classification" is equal to "mail address" as described as "6", a judgment is made as to whether or not a deletion is prohibited in accordance with the electronic mail address described in [To, from, Cc, Bcc, Header]. As the index "keyword content", the sort of header and the electronic mail address are designated. For example, [To:fool@ abc.co.jp] and [Cc:foo2@ bcd.co.jp] are designated.

When the index "keyword classification" is equal to "holder" as described in the above number "7", a holder within the electronic mail data storing RAM 13 which is prohibited to be deleted is designated. As the index "keyword content", the holder name (directory name) is designated. For example [¥do_not_erase] is designated.

Next, a description will now be made of a concrete range where electronic mail data is prohibited to be deleted.

When the index "keyword classification" is the above-described numeral number of 1, the data delete prohibition range covers all of contents of the relevant header in accordance with the electronic mail header code of the index "keyword content".

When the index "keyword classification" is the above-described numeral number of 2, the data delete prohibition range covers a first n-th line portion of a cited sentence and also a not-cited sentence in accordance with the cited line "n" of the index "keyword content".

When the index "keyword classification" is the above-explained numeral number of 3, if the index "keyword content" is equal to a phrase of a main document, then an overall paragraph containing this phrase (keyword) is prohibited to be deleted.

When the index "keyword classification" is the above-explained numeral number of 4, the data delete prohibition range covers all of main documents except for an attached file of the index "keyword content", or the designated attached file and the main document in accordance with the attached file of this index "keyword content".

When the index "keyword classification" is the above-described numeral number of 5, the data delete prohibition range covers such a line that a total number of spaces present at heads of the respective lines of the main document is smaller than, or equal to the designation number "n" in accordance with the designation number "n" indicative of the rank of the index "keyword content".

When the index "keyword classification" is the above-described numeral number of 6, the data delete prohibition range covers mails where relevant mail addresses are present in accordance with the mail addresses of the sender/receiver of the index "keyword content".

When the index "keyword classification" is the above-described numeral number of 7, the data delete prohibition range covers such mails existed in the relevant holders in accordance with the holders of the index "keyword content".

DELETION MARKER

FIG. 5 represents an example of a deletion marker capable of marking that a portion of an electronic mail is deleted.

In the case that a main document contained in an electronic mail is deleted, an indication "—Some line(s) is/are deleted" may constitute this deletion marker. In such a case that an attached file of an electronic mail is deleted, another indication " —Attached file is deleted <filename>—" may constitute this deletion marker. These deletion markers are displayed in combination with the content of the electronic mail.

SETTING OPERATION OF KEYWORD OPERATION CONDITION

Figure 6:
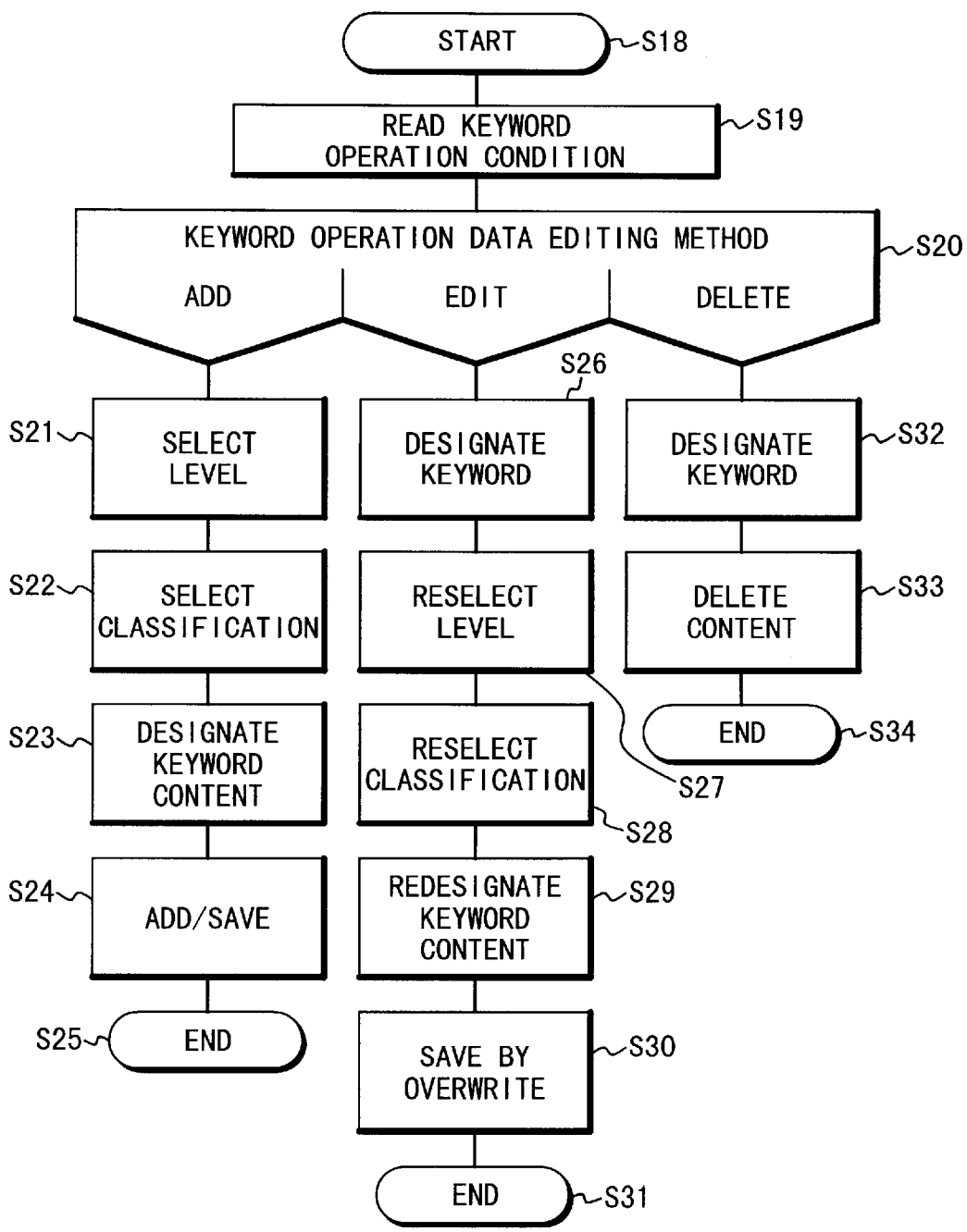
FIG. 6 is a flow chart for describing sequential operation to edit keyword operation condition data in the data storing apparatus of this embodiment.

Referring now to FIG. 1, FIG. 4, and FIG. 6, a sequential operation for setting the keyword operation condition to the keyword operation condition storing RAM 8 will be described.

In such a case that the keyword operation condition previously saved in the keyword operation condition storing RAM 8 is read out (step S19), and the keyword operation data is wanted to be "added" (step S20), the index "operation level" of the keyword is selected (step S21) so as to select the index "keyword classification" (step S22). Then, the index "keyword content" is designated (step S23) and the selected keyword operation data is additionally saved into the keyword operation condition storing RAM 8 (step S24).

In such a case that the keyword operation data is wanted to be "edited" (step S20), the index "keyword NO." which is wanted to be edited is designated (step S26), the index "operation level" of the keyword is again selected (step S27) and the index "keyword classification" is again selected (step S28). Then, the index "keyword content" is again designated (step S29), and this designated index "keyword content" is overwritten into the content of the keyword operation condition storing RAM 8 (step S30).

In the case that the keyword operation data is wanted to be "deleted" (step S20), the index "keyword NO." to be deleted is designated (step S32) so as to be deleted from the keyword operation condition storing RAM 8 (step S33).

VARIOUS CONTROLS OF ELECTRONIC MAIL DATA

Next, a description will now be made of contents of control processes for the electronic mail data (step S15) in FIG. 13 with reference to FIG. 1, FIG. 7, FIG. 8, FIG. 9, FIG. 10, FIG. 11, FIG. 12, and FIG. 13.

Figure 7:
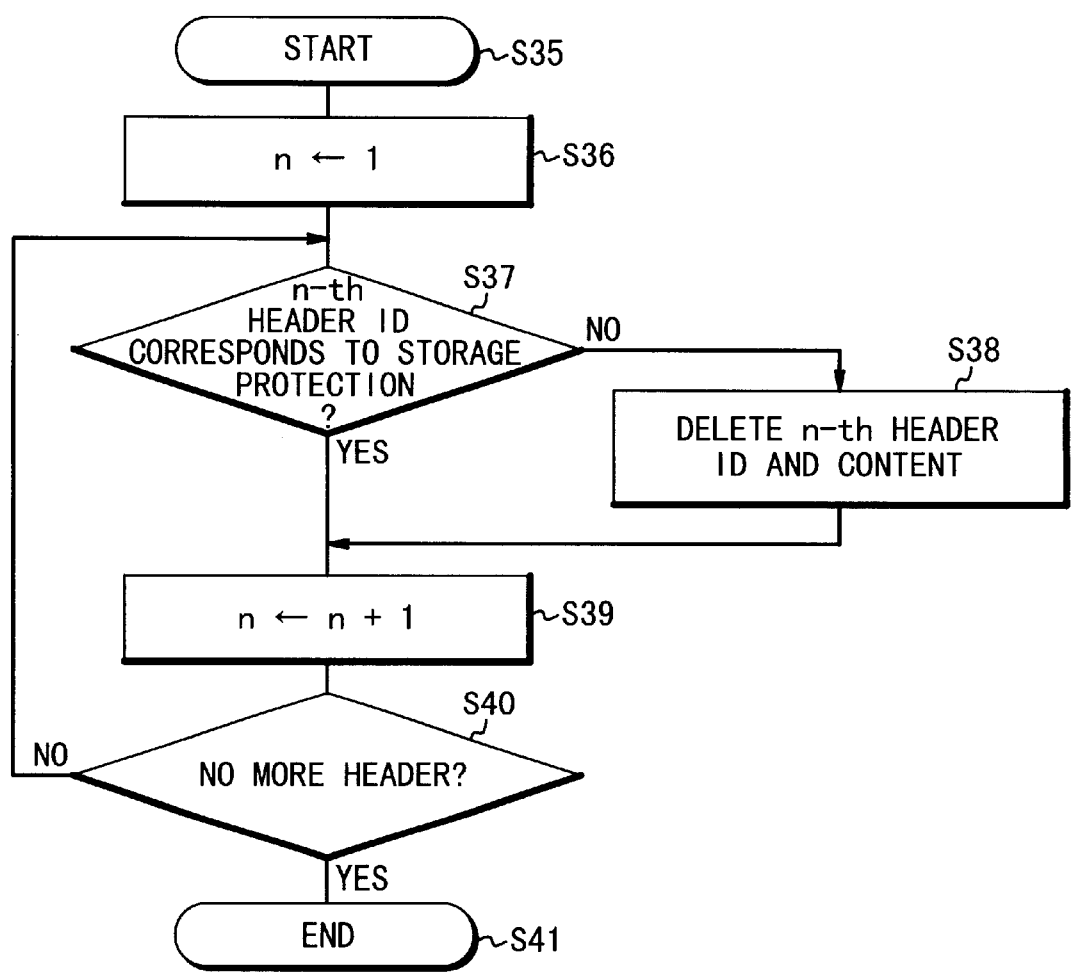
FIG. 7 is a flow chart for describing sequential operation to delete a portion of data based upon header data in the data storing apparatus of this embodiment.

Referring first to FIG. 1 and FIG. 7, a description will now be made of process flow operation when the "header code of electronic mail" is selected as the index "keyword classification". First, "1" is entered to "n" indicative of a position of a header line so as to perform the initial setting (step S36). A judgment is made as to whether or not a sort of an n-th header ID corresponds to the data delete prohibition subject set into the keyword operation condition storing RAM 8 (step S37). When this sort of the n-th header ID does not correspond to the data delete prohibition subject, n-th header information is deleted (step S38). The same operation is repeated until the last header (steps S39 and S40). As a result, only necessary header information is lefted.

Figure 8:
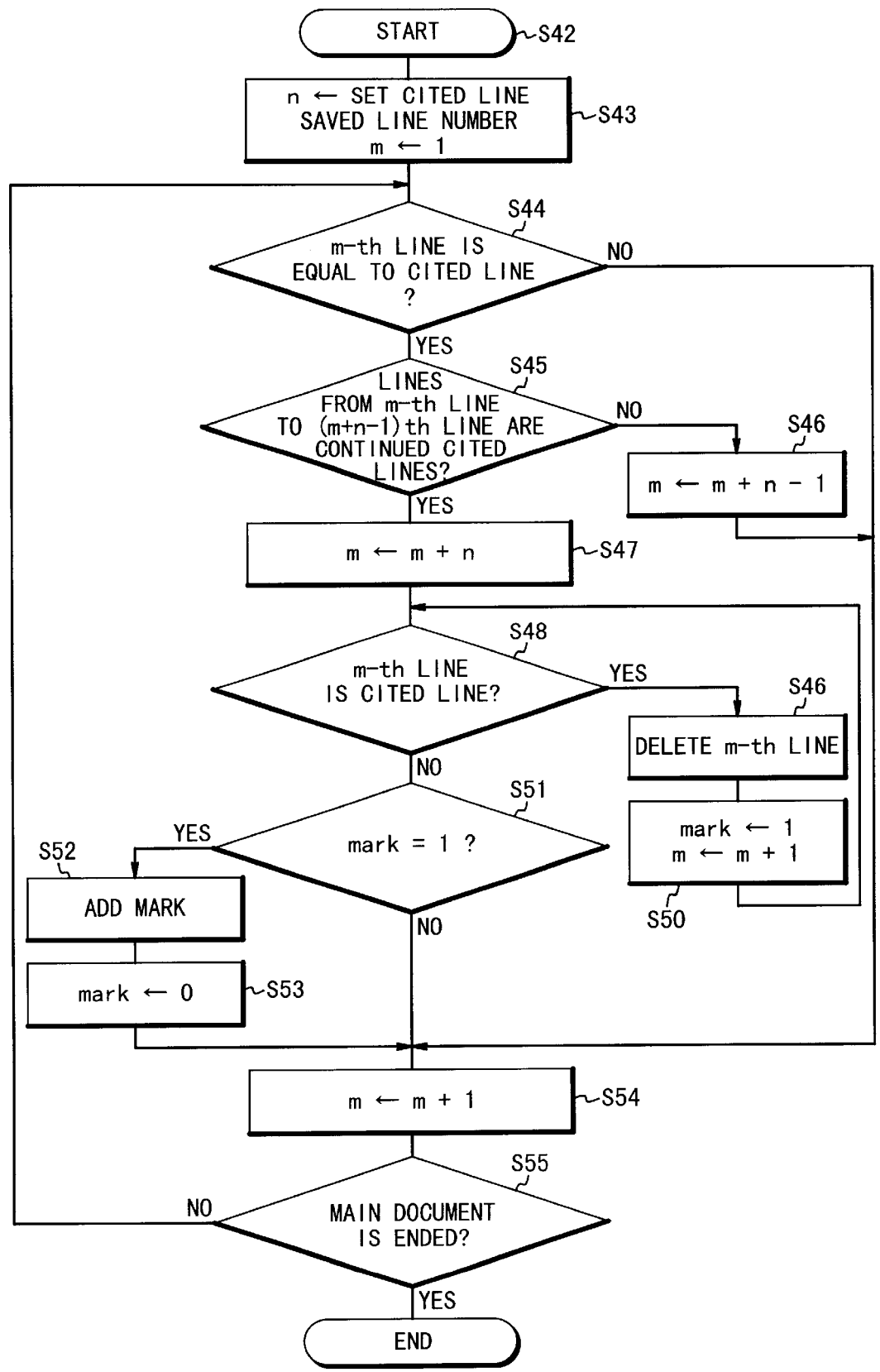
FIG. 8 is a flow chart for describing sequential operation to delete a portion of data based on cited data the data storing apparatus of this embodiment.

Next, a description will now be made of process flow operation when the "cited line" is selected as the index "keyword classification" with reference to FIG. 1 and FIG. 8. First, a value of cited line saving line number which is set in the keyword operation condition storing RAM 8 is substituted for "n" (in the example of FIG. 4, "3" is substituted for "n"), and "1" is substituted for "m" indicative of a position of a retrieved line of a main document so as to perform the initialization (step S43). A check is made as to whether or not an m-th line is equal to the cited line (step S44). When the m-th line is not equal to the cited line, the process operation is advanced to a next line (step S54). Conversely, when the m-th line is equal to the cited line, another check is done as to whether or not lines defined from the m-th line up to "(m+n-1)-th" line are equal to the continuously cited lines (step S45). When the cited lines are not continued, the process operation is advanced to an "m+n"-th line (steps S46 and S54). Conversely, when the cited lines are continued, the process operation is advanced to the "m+n" line (step S47). Subsequently, the lines up to the last cited line are repeatedly deleted (steps S48, S49, S50), and "1" is substituted for the "mark" value used to indicate as to whether or not the line deletion is carried out (step S50). After the cited line is ended (step S48), if the mark value is equal to 1 (step S51), then the deletion mark shown in FIG. 5 is additionally inserted (step S52), so that the mark value is equal to 0 (step S53). Subsequently, the process operation is repeated up to the final line (steps S54 and S55). As a result, both the main document except for the cited line and the first n-th line contained in the cited line are lefted as the data delete prohibition subject.

Figure 9:
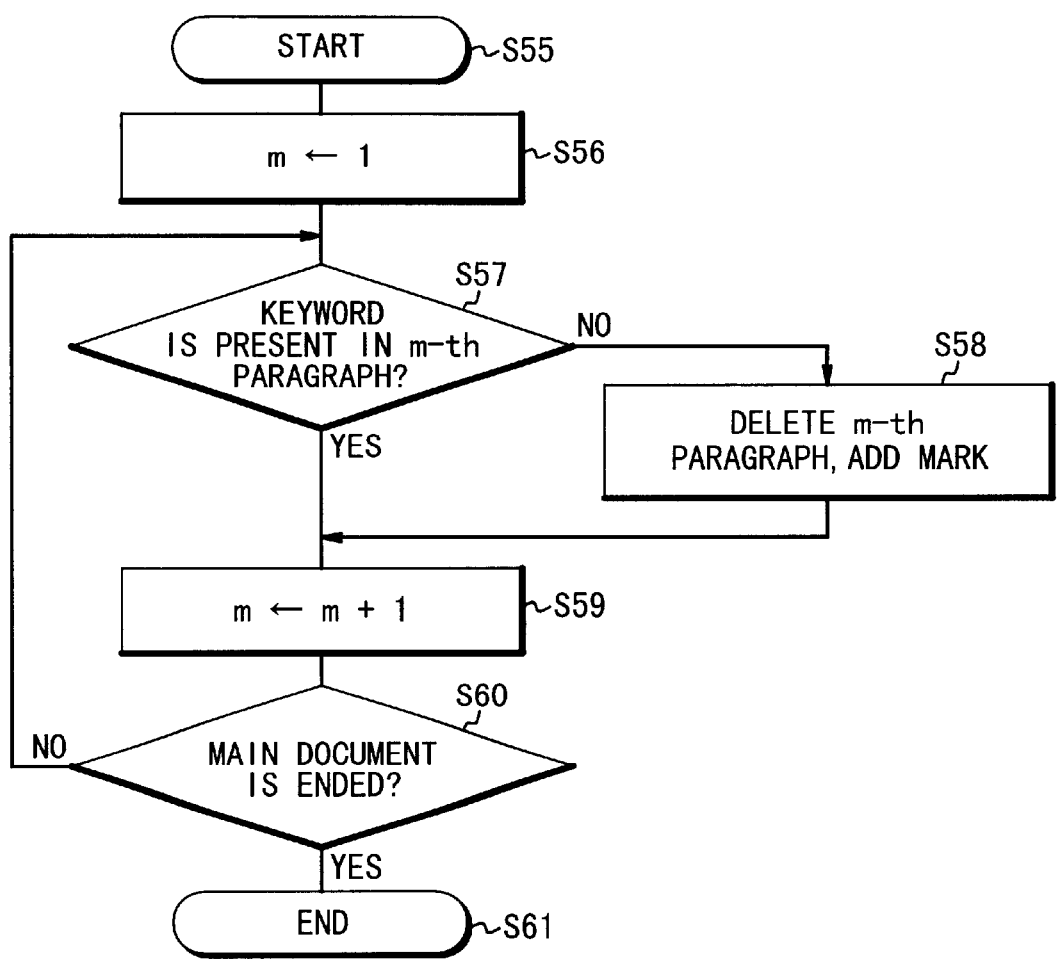
FIG. 9 is a flow chart for describing sequential operation to delete a portion of data based upon keyword data in the data storing apparatus of this embodiment.

Next, a description will now be made of process flow operation when the "phrase" is selected as the index "keyword classification" with reference to FIG. 1 and FIG. 9. First, "1" is substituted for "m" indicative of a position of a retrieved phrase of a main document so as to perform the initialization (step S56). A check is made as to whether or not a designated phrase is present within an m-th paragraph of a main document of an electronic mail at a step S57. This designated phrase is saved as the index "keyword content" in the keyword operation condition storing RAM 8. This electronic mail is saved In either the electronic mail data temporarily storing RAM 12 or the electronic mail data storing RAM 13. If there is no such a designated phrase, then the m-th paragraph is deleted, and the deletion marker of FIG. 5 is additionally inserted (step S58). This process operation is repeatedly performed until the last phrase of the main document (steps S59 and S60). As a result, only the m-th paragraph where the designated phrase is present is left as the data delete prohibition subject.

Next, a description will now be made of process flow operation when the "rank" is selected as the index "keyword classification" with reference to FIG. 1 and FIG. 10. First, a maximum number of line head space ("2" in example of FIG. 4) in a line of a deletion prohibition region is read from the keyword operation condition storing RAM 8, the read number is substituted for "S", and "1" is substituted for "m" indicative of a position of a retrieved line of a main document and also "1" is substituted for the mark value so as to perform the initialization (step S63). In the case that the line head space number of the m-th line is counted and then this counted space number is not smaller than, or equal to "S". (step S64), "1" is substituted for the mark value and the m-th line is deleted. The process operation is advanced to the next line (step S70), and the line deleting operation is continued until the line head space number becomes smaller than, or equal to "S". When the line head space number becomes smaller than, or equal to "S", if "mark"=1 (step S67), then the deletion marker for indicating that the line is deleted is additionally inserted (step S68), and "0" is substituted for the mark value (step S69). This process operation is repeated until the last line. After the line deletion of the last line is accomplished, if the marker value=1 (step S72), then the deletion marker is additionally inserted (step S73) and the process operation is accomplished. Conversely, if the marker value is not equal to 1, then the process operation is directly ended (step S74).

Figure 10:
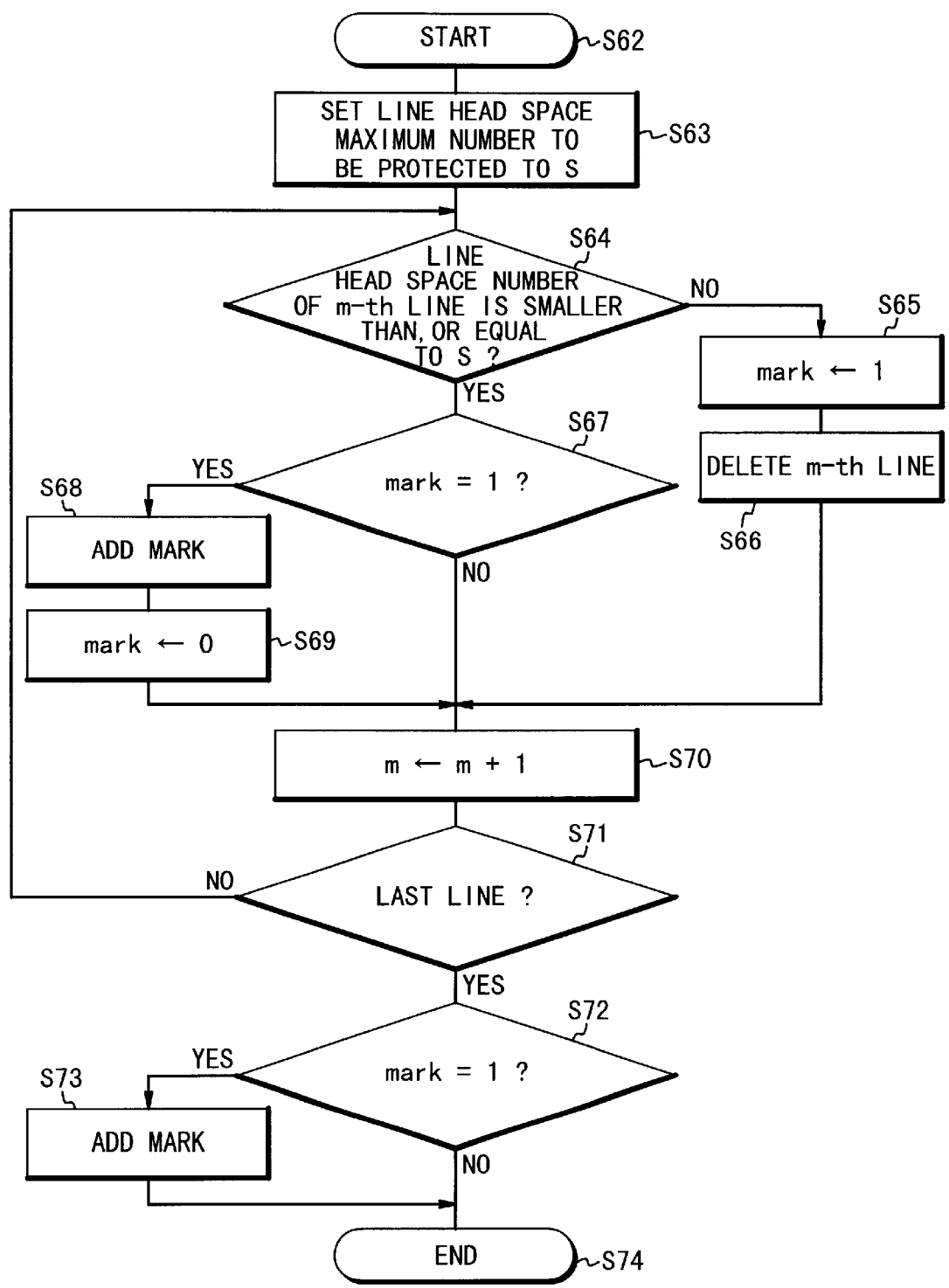
FIG. 10 is a flow chart for describing sequential operation to delete a portion of data based on space data in the data storing apparatus of this embodiment.
Figure 11:
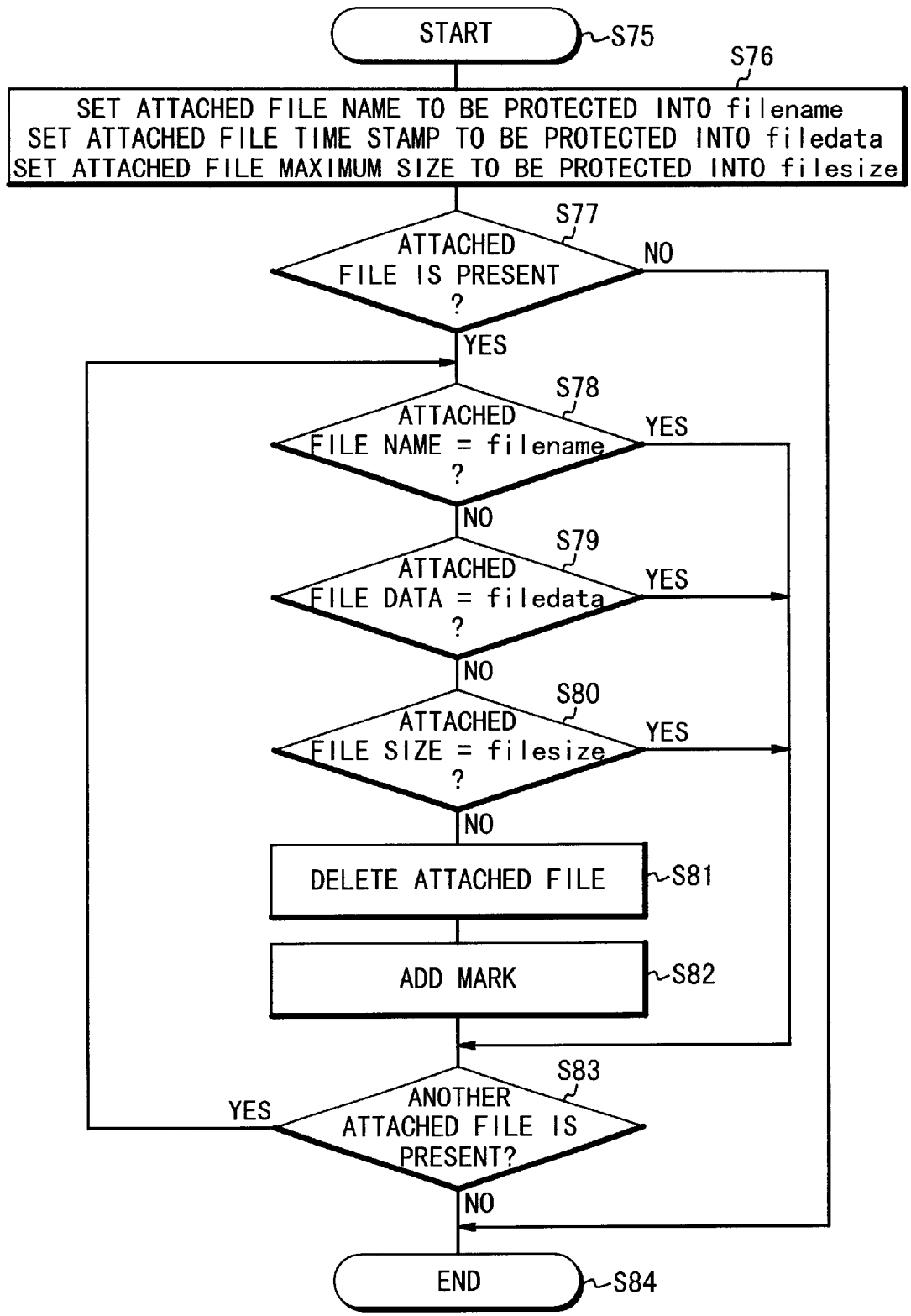
FIG. 11 is a flow chart for describing sequential operation to delete a portion of data based upon file data in the data storing apparatus of this embodiment.

Referring now to FIG. 1 and FIG. 10, a description will be made of process flow operation in such a case that "attached file" is selected as the index "keyword classification". The relevant attached file name which is prohibited to be deleted from the keyword operation condition storing RAM 8 is substituted for "filename", and a time stamp of the attached file is substituted for "filedate", and further a maximum size of the attached file is substituted for "filesize" (step S76). A check is made as to whether or not there is such an attached file (step S77). When there is no attached file, the process operation is directly ended (step S84). Conversely, when such an attached file is present, another check is done as to whether or not the name of this attached file corresponds to "filename" (step S78), whether or not the time stamp of this attached file corresponds to "filedate" (step S79), and whether or not the size of this attached file corresponds to "filesize" (step S80). When any one of the above-described conditions can be satisfied, the relevant attached file is prohibited to be deleted. Then, another attached file is retrieved (step S83). When the attached file does not correspond to all of these conditions, this attached file is deleted (step S81), and the deletion marker is additionally inserted (step S82). This process operation is repeated until there is no attached file, so that only such an attached file is left which is required to be saved.

Figure 12:
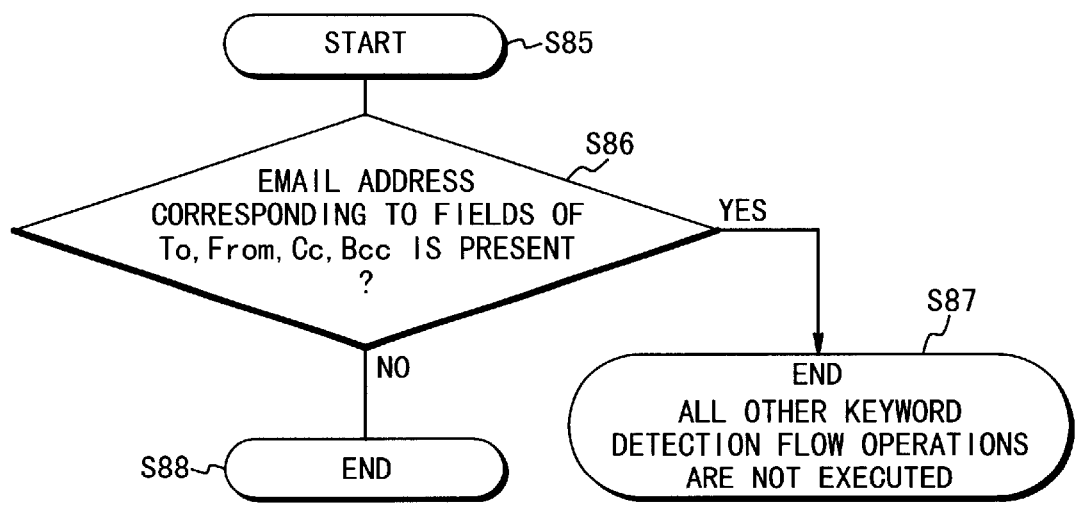
FIG. 12 is a flow chart for describing sequential operation to delete a portion of data based on mail address data in the data storing apparatus of this embodiment.

Referring now to FIG. 1 and FIG. 12, a description will be made of process flow operation in such a case that "electronic mail address" is selected as the index "keyword classification". The combination information between the header ID and the electronic mail address which is prohibited to be deleted is read out from the keyword operation condition storing RAM 8. A judgement is made as to whether or not the relevant electronic mail address is present in any one of the designated header information, namely [To:], [From], [Cc], or [Bcc] (step S86). When the relevant electronic mail address corresponds to any one of the designated header information, this electronic mail is determined to be saved, and the data deletion subject retrieve process based upon another index "keyword classification" is not carried out (step S87). Conversely, when there is not corresponding header information, the process operation is ended (step S88). The data deletion subject retrieve process based upon another index "keyword classification" is executed.

Figure 13:
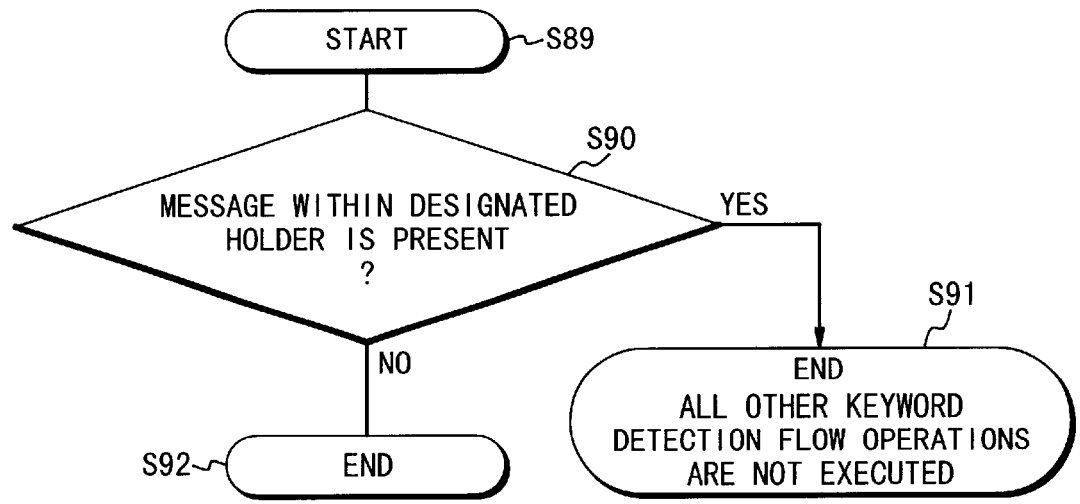
FIG. 13 is a flow chart for describing sequential operation to delete a portion of data based upon holder data in the data storing apparatus of this embodiment, FIG. 14 illustratively shows a structure of a frame related to a format of electronic mail data within a wireless section in the data storing apparatus of this embodiment, and FIG. 15 illustratively shows a structure of a frame related to a format of electronic mail data within a wireless section in the data storing apparatus of this embodiment.

Referring now to FIG. 1 and FIG. 13, a description will be made of process flow operation in such a case that "holder" is selected as the index "keyword classification". The relevant holder which is prohibited to be deleted from the keyword operation condition storing RAM 8 is read, and then a check is done as to whether or not this electronic mail is present within the designated holder in the electronic mail storing RAM 13 (step S90). When this electronic mail is located within the designated holder, this electronic mail is determined to be saved, and the data deletion subject retrieve process based upon another index "keyword classification" is not carried out (step S91). Conversely, when this electronic mail is not located in the designated holder, the process operation is normally ended. The data deletion subject retrieve process based upon another index "keyword classification" is executed (step S92).

FORMAT OF ELECTRONIC MAIL DATA

Next, a format of electronic mail data within a wireless section will now be explained with reference to FIG. 14 and FIG. 15.

Figure 14:
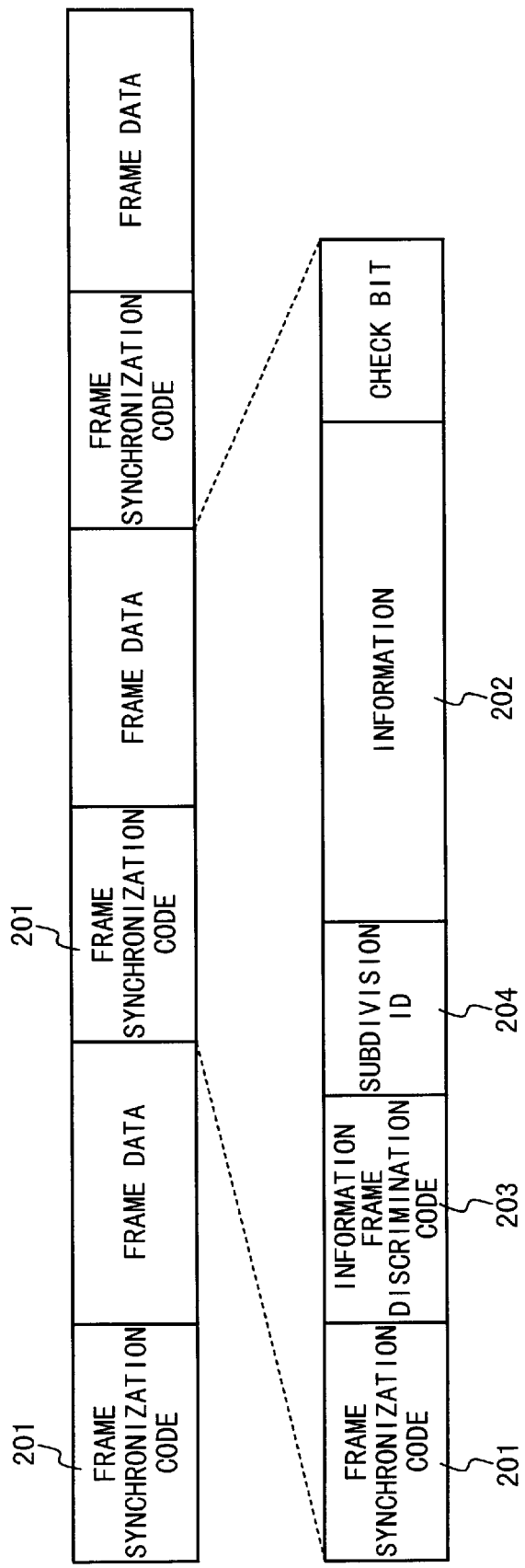

As indicated in FIG. 14, a signal format of electronic mail data within a wireless section is arranged in unit of a frame. A head of this frame signal is discriminated based upon a frame sync code 201 located at a head of each frame. A content of a frame is classified as a frame for speech data, a frame for a calling purpose, a frame for a system operation/management purpose, and a frame for information.

The electronic mail data is transferred by an information frame 202.

The information frame 202 may be discriminated based upon an information frame discrimination code 203 subsequent to a frame synchronization code 201. A division ID 204 is contained in the information frame 202 so as to subdivide/reconstruct an information block (subdivided data) (see FIG. 15). Also, the information frame 202 contains both ID information used to recollect the undivided information blocks, and sequence numbers indicative of sequence numbers for the subdivided information blocks. Both the ID information and the sequence number are used to send a mail resend request when the transmission of the above-described information block is dropped.

On the other hand, a structure of electronic mail data is described as in RFC #822 (STANDARD FOR THE FORMAT OF ARPA INTERNET TEXT MESSAGES) as follows:

[header information]+[region separation codes for header information and main document]+[main document]+[end code].

The header information is expressed as a repetition of:

[header ID]+[colon]+[header content]+[CR]+[LF].

The header ID is arranged by [To], [Cc], [From] which indicate information about a sender destination and a receiver, [subject] indicative of a title, and [Date] indicative of an issuing date. The header content is a content corresponding to each of header IDs.

The region separation code between the header information and the main document is arranged by:

[CR]+[LF].

Since this region separation code is arranged subsequent to the header information, this region separation code can be discriminated from the header information.

The main document directly corresponds to a main document of an electronic mail message.

In the case that the electronic mail data is transferred via the wireless section, as indicated in FIG. 14 and FIG. 15, the electronic mail data is subdivided into the respective frames on the wireless section, and the subdivided mail frames are arranged within the information block 202.

As previously described, in accordance with this embodiment, the electronic mail stored in the memory of the portable terminal is not selected in unit of the message. Instead, only the necessary message portion is selected from the entire content of each of the electronic mail message to be stored into this memory of the portable terminal. Also, the method for selecting the necessary message portion is changed in accordance with the empty capacity of the memory of the portable terminal. When there is a spare in the memory empty capacity, the potential of the selected message portions (namely, delete prohibition range) is increased, and the selected message portions is decreased in such a case that the memory empty capacity is decreased.

Also, in accordance with the embodiment, such a message portion which is not selected among the electronic mail message (namely, non-selected portion, or message portion not equal to data delete prohibition range) is not carried out only when this electronic mail message is received. In other words, such an electronic mail message is again deleted when the memory empty capacity is decreased as compared with when the saved electronic mail message was received. This electronic mail message was received in the past, and the non-selected portion thereof was once deleted. Thereafter, the resultant electronic mail message has been stored. When this message is again deleted, the selection message portion within the received message portions is decreased, and this deletion is carried out in accordance with the reduced selection portion. As a consequence, the necessary memory empty capacity can be maintained.

Furthermore, in accordance with this embodiment mode, all of the electronic mail messages are not entirely managed as unnecessary mail messages, but may be sequentially deleted from such a mail message having a low priority order of saving purposes, depending upon the remaining memory capacity. Also, the storage unit of the electronic mail is not set to the unit of the electronic mail, but the saved number of the electronic mails on the portable terminal can be increased as being permitted as possible.

Moreover, in accordance with the present invention, the memory having the small capacity can be effectively utilized. As a result, communication terminals equipped with small capacity memories operated in portable telephone systems can be utilized as terminals for communicating electronic mails. Also, portable terminals can be manufactured in low cost and also in a user friendly manner. In addition, for instance, when an electronic mail is read by using a portable terminal, such an unnecessary message portion is no longer read, and only necessary message portions can be read in a quick manner.

What is claimed is:

1. A data storing apparatus comprising:

a storing unit for storing data;

an empty capacity detecting unit for detecting an empty capacity of said storing unit;

a data deleting unit for deleting, a delete data portion, a portion of said data stored in said storing unit based on said detected empty capacity; and a deletion mark data attaching unit for attaching to said data, mark data corresponding to a deletion mark indicating that said delete data portion is deleted such that said deletion mark is displayed when said data is displayed.

2. A data storing apparatus comprising:

a storing unit for storing data;

an empty capacity detecting unit for detecting an empty capacity of said storing unit;

a data deleting unit for deleting, a delete data portion, a portion of said data stored in said storing unit based on said detected empty capacity; and a data selecting unit for selecting at least one from said plurality of data stored in said storing unit based on said detected empty capacity; and wherein said data deleting unit deletes a portion of said selected data as a selected delete data portion.

3. A data storing apparatus according to claim 2, wherein said data deleting unit changes at least one of a position of said selected delete data portion and an amount of said selected delete data portion based on said detected empty capacity when said selected delete data portion is deleted.

4. A data storing apparatus comprising:

a storing unit for storing data;

an empty capacity detecting unit for detecting an empty capacity of said storing unit;

a data deleting unit for deleting, a delete data portion, a portion of said data stored in said storing unit based on said detected empty capacity;

a designating unit for designating at least a portion of said data as a delete prohibition data portion, wherein said data deleting unit deletes at least a portion of said data other than said designated delete prohibition data portion;

a table in which a designation condition used to designate said delete prohibition data portion is stored, wherein said designating unit refers to said table to judge whether or not said data can satisfy said designation condition stored in said table, and designates said delete prohibition data portion based on said designation condition when said designating unit judges that said data can satisfy said designation condition.

5. A data storing apparatus according to claim 4, wherein said designation condition stored in said table is rewritable.

6. A data storing apparatus according to claim 4, wherein a plurality of said designation conditions are stored in said table and when said designating unit judges that said data can satisfy a first designation condition among said plurality of designation conditions, said designating unit designates said delete prohibition data portion without executing a judgement of whether or not said data can satisfy a second one among said plurality of designation conditions.

7. A data storing apparatus according to claim 4, wherein said stored designation condition corresponds to a specific data structural portion for constituting a portion of said data and said designating unit refers to said table to check whether or not said data contains said specific data structural portion stored in said table, and when said data contains said specific data structural portion, said designating unit designates a predetermined data portion corresponding to said specific data structural portion contained in said data as said delete prohibition data portion.

8. A data storing apparatus according to claim 7, wherein said predetermined data portion constitutes a unit selected from one of a line of said data, a paragraph of said data, and said data itself.

9. A data storing apparatus according to claim 4, wherein said stored designation condition corresponds to a combination of a specific data structural portion for constituting a portion of said data and said detected empty capacity, and said designating unit refer to said table to check whether or not said data contains said specific data structural portion combined with said detected empty capacity, and when said data contains said specific data structural portion combined with said detected empty capacity, said designating unit designates as said delete prohibition data portion, a predetermined data portion corresponding to said specific data structural portion combined with said empty capacity and contained in said data.

10. A data storing apparatus according to claim 9, wherein said predetermined data portion constitutes a unit selected from one of a line of said data, a paragraph of said data, and said data itself.

11. A data storing apparatus comprising:
a storing unit for storing a plurality of data;
an empty capacity detecting unit for detecting an empty capacity of said storing unit;
a data deleting unit for deleting, a delete data portion, a portion of said data stored in said storing unit based on said detected empty capacity;
a designating unit which can designate at least a portion of said data; and
a data classifying unit for classifying said plurality of data into subject data which is designated as a subject by said designating unit, and non-subject data which is not designated as a subject by said designating unit;
wherein said data deleting unit deletes at least a portion of said data other than said portion designated by said designating unit of said subject data, and said data classifying unit changes a ratio of said subject data to said non-subject data in said plurality of data based on said detected empty capacity.

12. A data storing apparatus according to claim 7, wherein said data is electronic mail data and
said specific data structural portion corresponds to any one of header data, cited data, attached file data, mail address data, and holder data, in which
said head data is contained in said electronic mail data,
said cited data is cited from another electronic mail data contained in said electronic mail data,
said attached file data is contained in said electronic mail data,
said mail address data is contained in said electronic mail data, and
said holder data is contained in said electronic mail data and indicates a holder for storing said electronic mail data.

13. A data storing apparatus according to claim 7, wherein said data is electronic mail data and
said specific data structural portion is any one of data indicative of a specific phrase contained in main sentence data indicative of a content of said electronic mail data, and data representative of a space number existed in an each line head of said main sentence data.

14. A data storing method comprising the steps of:
storing data in a storing unit;
detecting an empty capacity of said storing unit;
deleting, a delete data portion, a portion of said data based on said detected empty capacity; and
attaching to said data, mark data corresponding to a deletion mark indicating that said delete data portion is deleted such that said deletion mark is displayed when said data is displayed.

15. A data storing method comprising the steps of:
storing a plurality of data in a storing unit;
detecting an empty capacity of said storing unit;
deleting, a delete data portion, a portion of said data based on said detected empty capacity; and
selecting at least one from said plurality of data based on said detected empty capacity; wherein said step of deleting a delete data portion includes deleting a portion of said selected data as a selected delete data portion.

16. A data storing method according to claim 15, wherein said step of deleting a delete data portion includes changing at least one of a position of said selected delete data portion and an amount of said selected delete data portion based on said detected empty capacity when said selected delete data portion is deleted.

17. A data storing method comprising the step of:
storing data in a storing unit;
detecting an empty capacity of said storing unit;
deleting, a delete data portion, a portion of said data based on said detected empty capacity;
designating at least a portion of said data as a delete prohibition data portion, wherein said step of deleting a delete data portion includes deleting at least a portion of said data other than said designated delete prohibition data portion;
providing a table in which a designation condition used to designate said delete prohibition data portion is stored, wherein said step of designating at least a portion of said data includes referring to said table to judge whether or not said data can satisfy said designation condition stored in said table, and designating said delete prohibition data portion based on said designation condition when said data is judged to satisfy said designation condition.

18. A data storing method according to claim 17, wherein said step of providing a table includes providing said table such that said designation condition stored in said table is rewritable.

19. A data storing method according to claim 17, wherein said step of providing a table includes providing said table such that a plurality of said designation conditions are stored in said table, and said step of designating at least a portion of said data includes, when said data is judged to satisfy a first designation condition among said plurality of designation conditions, designating said delete prohibition data portion without executing a judgement of whether or not said data can satisfy a second one among said plurality of designation conditions.

20. A data storing method according to claim 17, wherein said step of providing a table includes providing said table such that said stored designation condition corresponds to a specific data structural portion for constituting a portion of said data, and said step of designating at least a portion of said data includes referring to said table to check whether or not said data contains said specific data structural portion stored in said table, and when said data contains said specific data structural portion, designating a predetermined data portion corresponding to said specific data structural portion contained in said data as said delete prohibition data portion.

21. A data storing method according to claim 20, wherein said step of designating at least a portion of said data includes designating said predetermined data portion which constitutes a unit selected from one of a line of said data, a paragraph of said data, and said data itself.

22. A data storing method according to claim 17, wherein said step of providing a table includes providing said table such that said stored designation condition corresponds to a combination of a specific data structural portion for constituting a portion of said data and said detected empty capacity, and said step of designating at least a portion of said data includes referring to said table to check whether or not said data contains said specific data structural portion combined with said detected empty capacity, and, when said data contains said specific data structural portion combined with said detected empty capacity, designating as said delete prohibition data portion, a predetermined data portion corresponding to said specific data structural portion combined with said empty capacity and contained in said data.

23. A data storing method according to claim 22, wherein said step of designating at least a portion of said data includes designating said predetermined data portion which constitutes a unit selected from one of a line of said data, a paragraph of said data, and said data itself.

24. A data storing method comprising the steps of:

storing a plurality of data in a storing unit;

detecting an empty capacity of said storing unit;

deleting, a delete data portion, a portion of said data based on said detected empty capacity;

providing a designating unit which can designate at least a portion of said data; and classifying said plurality of data into subject data which is designated as a subject by said designating unit, and non-subject data which is not designated as a subject by said designating unit, wherein said step of deleting a delete data portion includes deleting at least a portion of said data other than said portion designated by said designating unit of said subject data, and said step of classifying includes changing a ratio of said subject data to said non-subject data in said plurality of data based on said detected empty capacity.

25. A data storing method according to claim 20, wherein said data is electronic mail data and said specific data structural portion corresponds to any one of header data, cited data, attached file data, mail address data, and holder data, in which said head data is contained in said electronic mail data, said cited data is cited from another electronic mail data contained in said electronic mail data, said attached file data is contained in said electronic mail data, said mail address data is contained in said electronic mail data, and said holder data is contained in said electronic mail data and indicates a holder for storing said electronic mail data.

26. A data storing method according to claim 20, wherein said data is electronic mail data and said specific data structural portion is any one of data indicative of a specific phrase contained in main sentence data indicative of a content of said electronic mail data, and data representative of a space number existed in an each line head of said main sentence data.

* * * * *